United States Patent [19]

Petersen

[11] Patent Number: 4,458,227
[45] Date of Patent: Jul. 3, 1984

[54] ELECTROMAGNETIC ACTUATORS

[75] Inventor: Christian C. Petersen, Westwood, Mass.

[73] Assignee: Polaroid Corporation, Cambridge, Mass.

[21] Appl. No.: 367,361

[22] Filed: Apr. 12, 1982

[51] Int. Cl.³ .............................................. H01F 7/08
[52] U.S. Cl. .................................. 335/222; 354/234.1; 354/235.1; 310/14
[58] Field of Search .................... 335/222, 223, 234; 354/230, 234, 235; 310/12, 13, 14, 20; 318/685, 687

[56] References Cited

U.S. PATENT DOCUMENTS

| Re. 27,436 | 7/1972 | Sawyer | 346/29 |
|---|---|---|---|
| 2,951,190 | 8/1960 | Baermann | 335/231 |
| 3,022,400 | 2/1962 | Von Ahlefeldt | 200/93 |
| 3,087,772 | 4/1963 | Ascoli | 335/223 X |
| 3,320,445 | 5/1967 | Bey | 310/20 |
| 3,728,654 | 4/1973 | Tada | 335/234 |
| 3,836,835 | 9/1974 | Sawyer | 318/685 |
| 4,024,552 | 5/1977 | Kondo | 354/234 |
| 4,051,398 | 9/1977 | Kondo | 310/12 |
| 4,079,400 | 3/1978 | Kondo | 354/234 |
| 4,240,728 | 12/1980 | Wiedmann et al. | 354/38 |
| 4,316,661 | 2/1982 | Saito | 354/234 |
| 4,333,722 | 6/1982 | Lee | 354/234 |
| 4,338,009 | 7/1982 | Lee | 354/152 |
| 4,343,239 | 8/1982 | Seifert | 101/93.34 |
| 4,348,092 | 9/1982 | Hirohata et al. | 354/230 |
| 4,349,264 | 9/1982 | Tezuka et al. | 354/234 |

Primary Examiner—George Harris
Attorney, Agent, or Firm—Leslie J. Payne

[57] ABSTRACT

An electromagnetic actuator is disclosed comprising a substantially planar, permanent magnet arrangement providing at least one magnetic field extending generally normal to the plane of the magnet arrangement. Included is at least one conductor extending in a conductor plane generally parallel to the plane of the magnet arrangement with a portion of the conductor in intersecting relation to the field, whereby relative motion is effected between the conductor and the magnetic arrangement in their respective planes upon energization of the conductor. In one embodiment the magnetic arrangement is mounted for movement in a multiplicity of directions in the plane of the magnet arrangement and there are a plurality of separately energizeable conductors lying in or close to the conductor plane, each of the conductors having a portion configured for intersecting the one magnetic field at an angle different from other conductors.

13 Claims, 9 Drawing Figures

TO CONTROL CIRCUIT
& POWER SOURCE

FIG. 3

TO CONTROL CIRCUIT & POWER SOURCE

FIG. 4

TO CONTROL CIRCUIT & POWER SOURCE

TO CONTROL CIRCUIT
& SOURCE OF POWER

ELECTROMAGNETIC ACTUATORS

BACKGROUND OF THE INVENTION

This invention relates generally to motion producing apparatus of the electromagnetic kind. More particularly, it relates to a method of and apparatus for controlling movement of an armature in an actuator of the electromagnetic kind.

A wide variety of electromagnetic actuators exist. A typical motor or actuator is of the linear kind and includes a cylindrical bobbin about which is wound one or more field coils. Mounted within the bobbin is an armature. The armature may be comprised of a core formed from a piece of soft iron, as shown in U.S. Pat. No. 3,728,654, or it may be comprised of a plurality of permanent magnets, such as shown in U.S. Pat. Nos. 3,022,400, 3,202,886 and 3,495,147, or the armature may be a combination of a core and a permanent magnet. Through the application of direct current to the coil, a magnetic field is generated for facilitating production of a force sufficient for driving the armature in a given direction. Reverse application of the current polarity causes the armature to be driven in the opposite direction.

Another kind of linear actuator is disclosed in commonly-assigned U.S. Pat. No. 4,265,530, issued May 5, 1981, entitled "Shutter Blade Drive System", by the applicant of the instant invention. The described actuator represents an improvement over the kind mentioned above because it returns the armature to an original or central position upon deenergization. While such a linear actuator is extremely successful for the purposes intended, it nonetheless is limited to producing movement along a linear path. U.S. Pat. No. 3,320,445 discloses a pair of juxtaposed thin flat magnets and a coil with its axis transversely oriented to the plane of the magnets. The coil is energizeable for effecting a reciprocating motion of the magnets along a single fixed axis.

The above linear actuators are extremely effective and miniature. They can be used in a variety of situations. This is so especially where space, weight and low electric power consumption are desired. Despite their many advantages, however, there are certain limitations. One is that the armatures must move along a single path. Hence, the armatures cannot move in multiple directions.

U.S. Pat. No. 3,836,835 discloses a linear movement positioning system wherein an armature is movable along a single axis or a pair of coordinate axes. U.S. Pat. No. 3,904,900 discloses a pulse operated two-axes magnetic positioning device by which an object can be transferred in a first direction, a second direction which is not parallel to the first direction or in any direction between the first and second directions on a horizontal plane. These devices, however, accomplish the two-axes positioning by a plurality of conventional pulse operated electromagnetic motors.

SUMMARY OF THE INVENTION

In accordance with the present invention, there is provided an electromagnetic actuator comprising a substantially planar, permanent magnet arrangement providing at least one magnetic field extending generally normal to the plane of the magnet arrangement. Included in the actuator is at least one conductor extending in a conductor plane generally parallel to the plane of the magnet arrangement with a portion of the conductor in intersecting relation to the field, whereby relative motion is effected between the conductor and the magnet arrangement in their respective planes upon energization of the conductor.

In an illustrated embodiment, the magnet arrangement provides a pair of oppositely polarized fields extending generally normal to the plane of said magnet arrangement and located in adjacent relation along a given axis of the magnet arrangement and mounted for movement along a multiplicity of directions lying in the plane of the magnet arrangement.

In another illustrated embodiment, there is additionally provided separately energizeable conductors lying in or close to the conductor plane, each of the conductors having a portion thereof configured for intersecting the magnetic field at an angle different from intersecting portions of other conductors.

In another embodiment, there is provided an actuator wherein the magnet arrangement is an elongated member with at least one of said fields being of given minimum width, the given axis being the longitudinal axis of said member as measured along the given axis, and the conductor being an elongated loop with a width greater than the given minimum width of said magnetic fields and with one of the short portions of the loop configured to intersect at least one of the magnetic fields to effect the relative motion and the long portions of the loop configured to be generally outside of at least one of the magnetic fields.

In accordance with the present invention, there is provided a method of generating multidirectional movement comprising the steps of having a permanent magnet arrangement providing at least a magnetic field extending generally normal to a plane of the magnet arrangement and being mounted for movement along a multiplicity of directions lying in said plane of said magnet arrangement; having a plurality of separately energizeable conductors lying in or close to said conductor plane, each of said conductors having a portion thereof configured for intersecting the magnetic field at an angle different from the other conductors; and, energizing selected ones of said conductors to effect relative multidirectional movement between said magnet arrangement and said conductors.

Among the objects of the invention are the provision of an electromagnetic actuator and method, whereby an armature can move in a multiplicity of directions; the provision of an actuator of the above kind in which an armature can move along a plurality of non-fixed paths by energizing a plurality of energizeable means in a predetermined manner; the provision of an electromagnetic actuator having a pair of adjacent polar regions of opposite polarity offset with respect to each other along a longitudinal axis and a plurality of conductors physically arranged relative to the offset magnets so as to provide a plurality of variable driving forces which displace the magnets along variable paths and at variable speeds; the provision of an electromagnetic actuator having a pair of adjacent and oppositely polarized magnetic fields in conjunction with conductors arranged in such a relationship with respect to the fields so as to eliminate the need for a magnetic flux return member; and the provision of an actuator which has the characteristics mentioned above and which is relatively small in size, constructed of relatively few components and requires low power consumption for operation.

Other objects and further scope of applicability of the present invention will become apparent from the detailed description to follow when taken in conjunction with the accompanying drawings, wherein like parts are designated by like reference numerals.

BRIEF DESCRIPTION OF THE DRAWINGS

FIG. 8 is a schematic planar view of still another embodiment of the present invention; and, FIG. 9 is a schematic planar view of yet another embodiment of the present invention.

DETAILED DESCRIPTION

Figure 1:
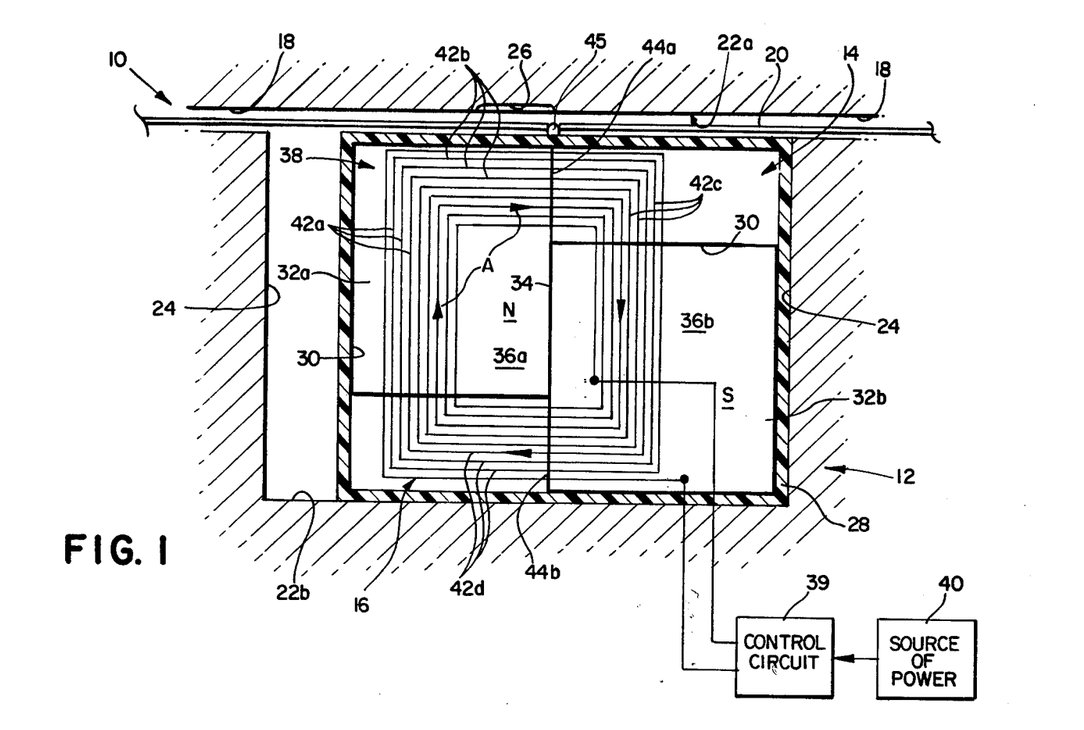
FIG. 1 is a schematic illustrating components of the actuator of this invention when in one position.
Figure 2:
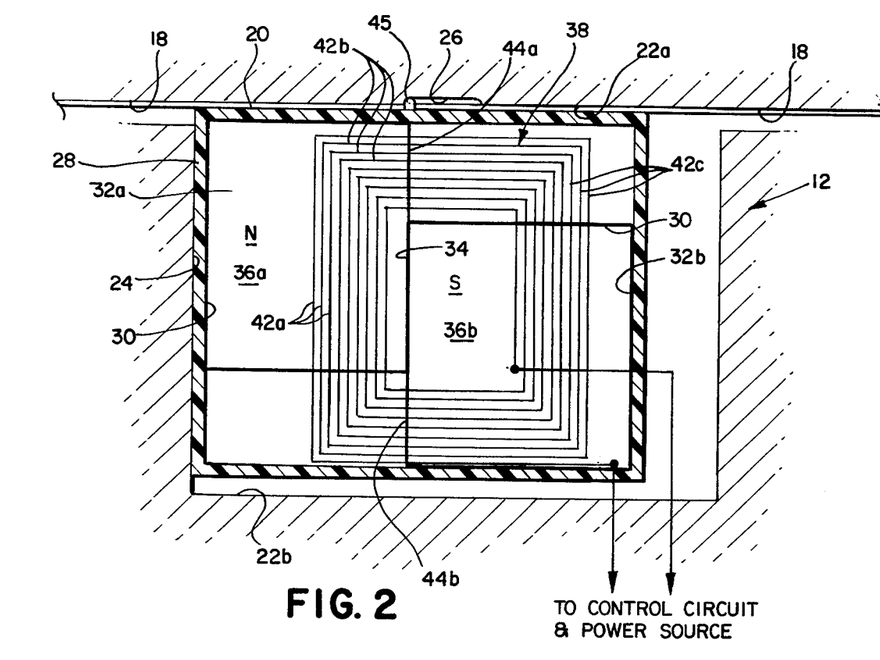
FIG. 2 is a schematic similar to FIG. 1, but showing the actuator in a different position after being actuated.

Reference is initially made to FIGS. 1 and 2 for showing one embodiment of an actuator 10 made in accordance with the principles of this invention. As seen, the actuator 10 is supported in and housed by a housing assembly 12. Included in the actuator 10 are magnetic and coil assemblies 14 and 16; respectively. Aligned and spaced apart openings 18 are formed in the housing assembly 12. These openings 18 permit incremental displacement therethrough of a web of material, such as a continuous drivable belt 20. Formed in the housing assembly 12 are top and bottom interior walls 22a, 22b, respectively, and interior end walls 24. An elongated guiding slot 26 is formed in the top wall 22a. The interior walls of the housing assembly 12 form means for limiting movement of the magnet arrangement or assembly 14 in a manner which will be made apparent.

Now, specifically referring to the magnet assembly 14, it includes a thin and generally rectangular carrier member 28 made of a non-magnetic and non-conducting material, such as Delrin, a plastic sold by E. I. DuPont de Nemours and Company. When the carrier 28 is in a stationary or normal position (FIG. 1), the bottom surface thereof rests normally on bottom wall surface 22b, while the rightward surface of the carrier abuts the right end wall 24. Formed in the carrier 28 is a pair of generally rectangular recesses 30. Each recess 30 is sized and configured for receiving and retaining therein one of a pair of thin and generally rectangular permanent magnets 32a, 32b. Although a pair of magnets 32a, 32b is disclosed, the present invention contemplates use of a single magnet having a pair of adjacent magnetic domains of opposite polarity.

As observable, the permanent magnets 32a, 32b are juxtaposed along a common boundary 34 and are offset vertically relative to each other. As will be made apparent, this offset allows the formation of electromotive forces for moving the armature or magnet assembly 14 in multiple directions. It will be appreciated that the pair of magnets 32a, 32b need not lie in the same or parallel planes, but can be angularly oriented with respect to each other. In this embodiment, each of the permanent magnets 32a, 32b is, preferably, of the rare earth type, such as samarium cobalt. The faces 36a, 36b of the permanent magnets 32a, 32b; respectively, define opposite magnetic polar regions. For purposes of illustration, the faces 36a, 36b define opposite magnetic poles N and S; respectively. The magnetic fields generated by the magnetic faces 36a, 36b extend substantially vertically from the plane of the paper of the drawing and interact with the electromagnetic fields created by the stator assembly 16 for purposes of driving the armature assembly 14 in a manner to be described. Since these are rare earth magnets, their fields tend to be ballistic. In other words, they extend upwardly from the faces in an area which is coextensive with the area of the faces.

Now referring to the coil assembly 16, it is seen to include a continuous, generally planar and rectangular electrical conducting field coil 38. The coil 38 has a plurality of windings which are connected to a suitable control circuit 39 and appropriate source of, preferably, DC, electrical power 40. The control circuit 39 controls the amplitude and polarity of the electric current passing through the coil 38. The field coil 38 can be housed in a suitable plastic jacket (not shown). In this embodiment, the field coil 38 is stationary, and it is fixedly connected to the housing assembly 12 through conventional means (not shown). As will be explained, the magnet assembly 14 will move at a speed and in a direction which depends on magnitude and direction of the current flowing in the coil 38.

The windings of the field coil 38 are divisible into four interconnected coil segments 42a-d. Each of the segments is generally transversely oriented to the adjacent coil segments. Because of this arrangement, the segments of each of the opposing pairs of segments 42a, 42c; and 42b, 42d; respectively, have the current traveling therethrough in opposite directions (see arrows A). Stated somewhat differently, the coil segment 42a has current flowing through it in a direction opposite to the current in the coil segment 42c; while the coil sgement 42b has current flowing through it in a direction opposite to the current flow in the coil segment 42d.

As seen in FIG. 1, the coil segments 42a, 42c extend across respective portions of the magnetic faces 36a, 36b. Transversely disposed coil segments 42b and 42d extend across offset and extending portions 44a, 44b of the magnets 32a, 32b; respectively. Thus, the transversely disposed coil segments 42a, 42b extend across and into the magnetic field of the permanent magnet 32a, while the coil segments 42c, 42d extend across and into the magnetic field of the permanent magnet 32b.

Upon further consideration of FIG. 1, it will be noted that the innermost windings of the coil segments 42a, 42c are spaced from the common boundary 34.

As observed, each of the group of coil segments 42a, 42c has a combined width along the horizontal axis, which is significantly less than the length of the magnetic fields defined by the faces 36a, 36b along the same axis, and the innermost windings are sufficiently spaced from the boundary 34 such that during horizontal translation of the assembly 14, the coil segments 42a, 42c do not intercept the adjacent magnetic field. Because of this relationship, there is no need to have a flux return plate spaced above the coil 38 to insure that the flux of the north magnetic pole travels upwardly through the coil segments 42a, 42b and to the south magnetic pole back through the other coil segments 42c, 42d. Without the requirement of a flux return plate, the present actuator can be made much thinner and lighter. Also, the innermost windings of the top and bottom coil segments 42b, 42d are spaced from the top and bottom ends of the magnets 32b, 32a; respectively. These spacings are sufficient to insure that when the magnet assembly 14 is vertically translated the magnet face 36b will not intercept the coil segments 42b and the magnetic face 36a will not intercept the coil segments 44b.

The operation of this embodiment will be described hereinbelow. For purposes of driving the belt 20 leftwardly from the position in FIG. 1, electrical current is supplied by the control circuit 39 to the field coil 38. The direction of the current is indicated by the arrows A; and, as a result thereof, the magnet assembly 14 moves to the position shown in FIG. 2. The magnet assembly 14 is, in effect, driven simultaneously both upwardly and leftwardly from the FIG. 1 position. The leftward translational component of the movement is generated by the interaction of the electromagnetic fields of the opposing coil segments 42a, 42c with the magnetic fields of the permanent magnets 32a, 32b; respectively. More specifically, the energized coil segments 42a create electromagnetic fields which interact with the north magnetic field of the permanent magnet 32 to drive the magnet assembly 14 leftwardly. Contemporaneously, a leftward driving force is produced from the interaction of the electromagnetic fields of the coil segments 42c with the south magnetic field of the magnet 32b. On the other hand, the upward driving force component is created because of the interaction of the electromagnetic fields of the opposing coil segments 42b, 42d interacting exclusively and respectively with the opposing magnetic fields of the offset magnetic portions 44a, 44b. During upward movement, a projection 45 on the carrier 28 enters a sprocket (not shown) of the belt 20 and engages and then slides within the guide slot 26. The guide slot 26 guides the carrier 28 leftwardly, and the belt 20 is thus driven. Obviously, the inner walls of the housing assembly 12 limit movement of the magnet assembly 14.

For returning the magnet assembly 14 to the position in FIG. 1, the control circuit 39 is operated to reverse the polarity of the current flowing through the field coil 38. This reverses the direction of the electromagnetic fields produced by the coil segments 42a-d. These reversed fields interact with the magnetic fields of the magnets 32a, 32b in an opposite manner to drive the magnet assembly 14 simultaneously in the reverse directions (i.e., rightwardly and downwardly). This reverse movement continues until the magnet assembly 14 comes to rest against the bottom and right inner walls of the housing assembly 12, see FIG. 1. During this return, the driving projection 45 releases the belt 20. It will be appreciated that the belt 20 has been incrementally advanced leftwardly by a preselected distance.

It is pointed out that the foregoing describes the sequence of events during an operational cycle. Obviously, by repeating such cycle, the belt 20 is continuously, incrementally driven.

Figure 3:
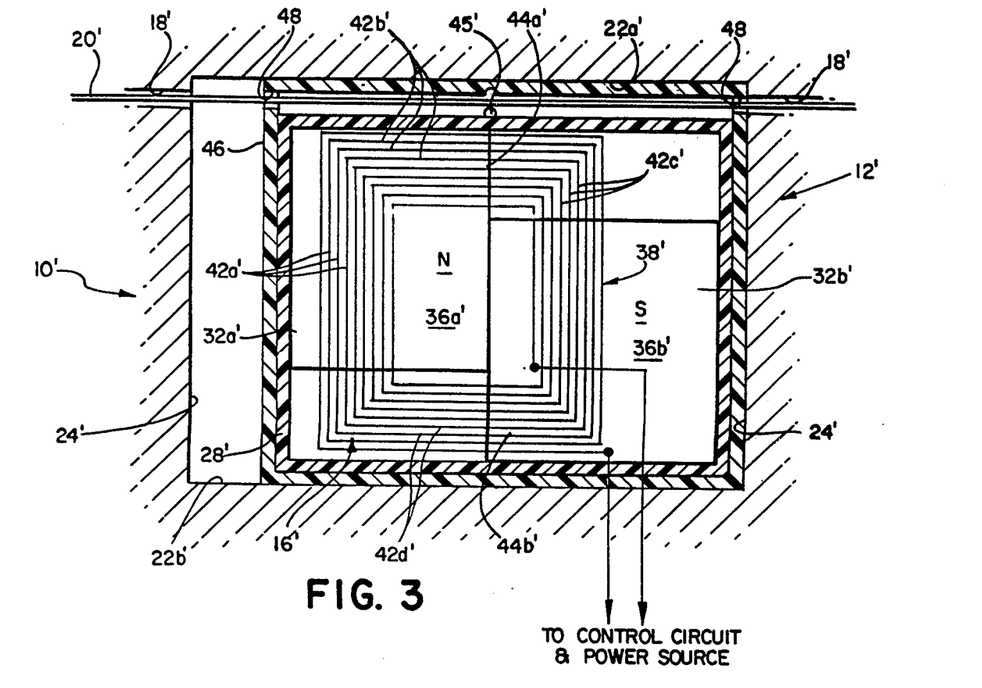
FIG. 3 is a schematic showing another embodiment of an actuator in one position.
Figure 4:
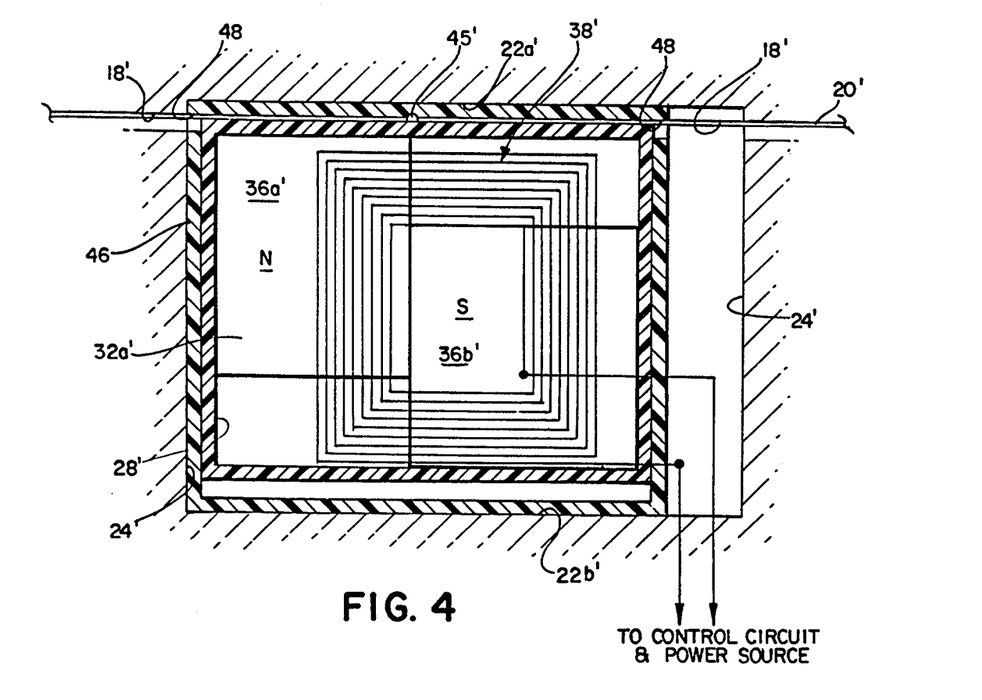
FIG. 4 is a schematic similar to FIG. 3, but showing the actuator in another position after being actuated.

Reference is now made to FIGS. 3 and 4 for purposes of describing an alternate embodiment. The structure of this embodiment which is similar to the previous embodiment is indicated by like reference numerals with, however, the addition of a prime marking. In this embodiment, as in the previous, the magnet assembly 14' is not fixed and is allowed to move in multiple directions to advance incrementally the belt 20'.

In this embodiment the movable magnet assembly 14' includes a second generally thin and rectangular carrier 46. The carrier 46 is sized and configured to retain for movement therein the carrier 28' and is constructed of the same material as the carrier 28'. As shown, the carrier 28' is vertically movable within a space defined by the carrier 46. The carrier 46 is also longitudinally slidable between the end walls 24' while being in sliding engagement with the top and bottom wall surfaces 22'. Opposite end walls of the carrier 46 have openings 48 aligned with the openings 18' for allowing passage therethrough of the belt 20'.

In this embodiment, the conducting coil 38' is juxtaposed to the planar magnets 32'a, 32'b so that the coil segments 42'a, 42'b remain within the magnetic field of the permanent magnet 32'a, while the coil segments 42'c, 42'd remain within the magnetic field of the permanent magnet 32'b during movement of the armature assembly 14'.

In the operation of this embodiment, the field coil 38' is energized by the control circuit (not shown). Assuming the current to flow in the direction of the arrows shown in FIG. 3, the carrier 28' is moved upwardly relative to the carrier 46 until the projection 45' projects through a sprocket in the belt 20' and engages an opening in the carrier 46. This forces the belt 20' into tight frictional engagement with the interior of the carrier 46. Simultaneously, the carrier 46 is driven leftwardly by the magnet assembly 14' until it engages the left end wall 24', See FIG. 4. Consequently, the belt 20' is driven leftwardly. Moreover, because the belt 20' is sandwiched between the carriers 28' and 46, it is not dragged along the inner walls of the housing assembly. This reduces significantly dragging friction on the belt 20' and thereby enhances its useful life.

Of course, reversing the polarity of the current through the field coil 38' causes the carriers 28', 46 to return to their normal positions as shown in FIG. 4. By repeating this cycle, the belt 20' is incrementally driven.

Figure 5:
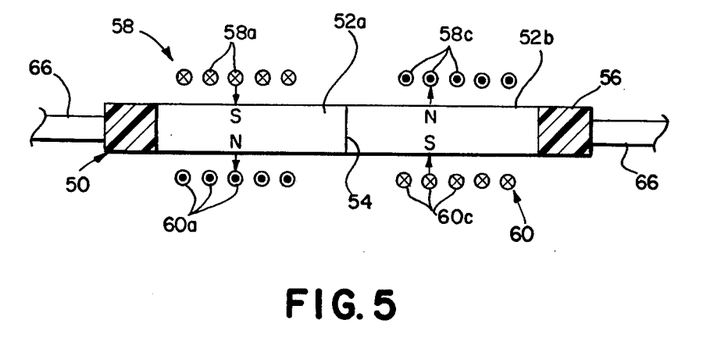
FIG. 5 is a schematic planar view showing another embodiment of the present invention.
Figure 6:
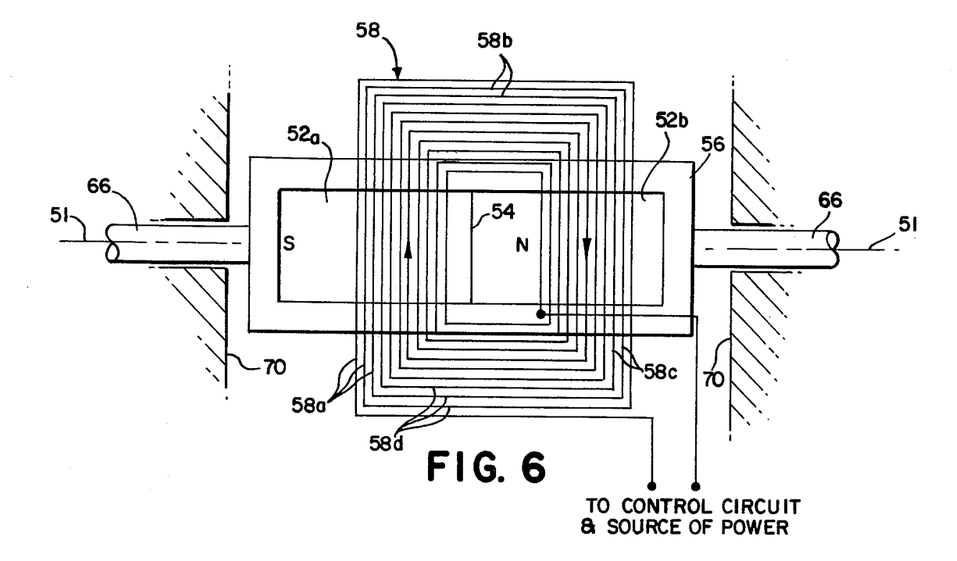
FIG. 6 is a schematic elevational view of the actuator shown in FIG. 5.

Reference is now made to FIGS. 5 and 6 which show schematically another embodiment of this invention. It differs from the others in that the magnet assembly 50 reciprocates along a single axis 51. In this embodiment a magnet assembly 50 is shown comprised of a pair of thin permanent, preferably rare earth, magnets 52a, 52b; such as samarium cobalt. Although a pair of magnets are disclosed, it will be appreciated that a single magnet could be used, but with a pair of polar regions on a single surface thereof. The magnets 52a, 52b are coupled together along a common boundary 54 and move in unison with each other. Of course, the magnets 52a, 52b can be spaced from each other. For purposes of illustration, the magnet 52a can have its top surface with a south magnetic pole S, while the bottom surface thereof would have a north magnetic pole N. On the other hand, magnet 52b has a north magnetic pole N on the top and a south magnetic pole S on the bottom. These magnets 52a, 52b are mounted in recesses of a plastic carrier 56. The magnet assembly 50 is movable relative to a pair of spaced apart and identical top and bottom planar coils 58, 60; respectively.

The coils 58, 60 are respectively superposed relative to the top and bottom surfaces of the permanent magnets 52a, 52b. The coil 60 is not seen in FIG. 6 because it is below the coil 58. These coils 58 and 60 can be suitably mounted in plastic material and stationarily affixed. It will be noted that the segments 58a, 60a; and 58c, 60c, respectively, remain within the magnetic fields of their magnets 52a, 52b.

As seen best in FIG. 5, the current in coil segment 58a is opposed in direction to that in 58c, while the current in the coil segment 60a flows in a direction opposite to that in coil segment 60c. While the coil segments 58b, 58d; 60b, 60d (not shown but corresponding to the coil segments 58b, 58d) are energized, they do not interact with the noted magnetic fields because they are positioned outside the magnetic fields. Because the permanent magnets are of the rare earth type, their fields have a ballistic effect; that is, their fields extend from the magnet faces so that they tend to be concentrated in the area defined by the magnetic faces. Thus, only the coil segments 58a, 58c and 60a, 60c contribute to the translatory motion. As noted previously, the combined width dimensions of each of the bundle of coil segments 58a, 58c; 60a, 60c along the longitudinal axis 51 are less than the dimensions of the respective magnetic fields they are in. Moreover, in this regard the axial translation of the magnet assembly 50 is such that these coil segments 58a, 58c; 60a, 60c will not cross the boundary 54 and thus will remain outside the field of the adjacent magnetic field. For instance, flux from the north pole of magnet 52b will travel upwardly through the coil segments 58c and downwardly through the coil segments 58a to the south pole of the magnet 52a. Thus, the possibility of flux traversing the same coil segments twice is eliminated. Although not necessary, a pair of spaced apart flux return plates (not shown) can be provided. Each plate would be superposed above a respective one of the conducting coils 58, 60.

Operation of this embodiment is as follows. Through operation of the control circuit, not shown but similar to that of FIGS. 1 and 2, preferably DC current flows from a suitable power source (not shown) through the top conducting coil 58 in the direction of the arrows in FIG. 6. This creates opposing electromagnetic fields in the coil segments 58a, 58c. These opposing fields interact with respective ones of the opposing magnetic fields of the magnets 52a, 52b to drive linearly the magnet assembly 50 rightwardly. Thus one of the output members 66 connected to the carrier 56 moves rightwardly. Such movement is stopped when the carrier 56 abuts against a motion limiting stop indicated schematically by reference numeral 70. To drive the magnet assembly 50 in the reverse direction, the lower conducting coil 60 is energized by the control circuit, while the top conducting coil 58 is deenergized. Further, towards that end the current will flow in the coil 60 in a direction opposite that of the coil 58. In this regard, it will be observed that the coil segments 60a have the current flowing out of the plane of the paper and the segments 60c have the current flowing into the plane of the paper, as indicated by conventional notation. The coil segments 60a, 60c create electromagnetic fields with opposing directions that interact with the opposite magnetic fields of the magnets 52a, 52b. As a result, the magnet assembly 50 is driven in the reverse direction (i.e., leftwardly) until the carrier 56 abuts against the other motion limiting stop 70. Accordingly, by having a control circuit alternate the energization of the top and bottom coils 58, 60 in the manner indicated the magnet assembly 50 can easily reciprocate.

Although this embodiment describes that the magnetic assembly 50 is movable, it should be understood that it can be stationary and the coils 58 and 60 made movable. Also, although this embodiment discloses a pair of coils 58 and 60 for effecting bidirectional translation, it will be appreciated that a single coil can be used instead. In this regard, by reversing the polarity of current through a single coil, bidirectional movement of the magnet assembly 50 can be achieved.

Figure 7:
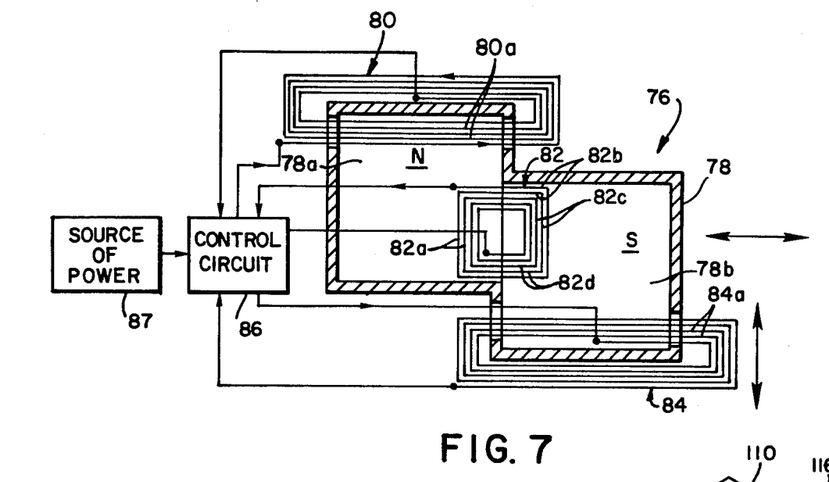
FIG. 7 is a schematic planar view of another embodiment of the present invention.

Reference is now made to FIG. 7 for showing another embodiment of the present invention. In this embodiment, the magnet assembly 76 can be controlled so as to move along transverse axes and along any axis between the transverse axes. As depicted, the magnet assembly 76 includes a carrier member 78 which has recesses formed therein for receiving and maintaining in juxtaposed offset relationship a pair of permanent magnets 78a, 78b. The carrier 78 can be made of a suitable non-magnetic and non-conducting material as Delrin. The magnets have opposing magnetic polar regions facing in a common direction (i.e., from the plane of the drawing). In this embodiment, the magnet 78a has its north pole N region facing upwardly while the magnet 78b has its south pole S region facing upwardly. As with the previous embodiment, these permanent magnets are preferably of the rare earth type, such as samarium cobalt. To effect the desired movement there is provided a plurality of superposed planar coils 80, 82 and 84. Each of the flat coil segments 80, 82 and 84 are directly connected to a control circuit 86. The control circuit 86 can be of any conventional type and serves to digitally control, preferably DC, voltages from the source of power 87 to the various coils 80-84 in certain predetermined sequences so that the polarity and amplitude of the voltage regulates the direction and speed of the armature assembly 76 in a manner subsequently made apparent. Each of the coils 80-84 may be encased in a plastic jacket (not shown) and stationarily affixed relative to the movable magnet assembly 76 shown in FIG. 7.

Referring to the coil assembly 80, it has horizontal segments 80a traversing across the north polar field of the permanent magnet 78a. Since the other coil segments of the coil 80 are outside the magnetic field of the magnet 78a the current flowing through them will not have an effect upon the magnet assembly 76 insofar as there is an absence of interaction between their electromagnetic fields and the field of the permanent magnet 78a. When current flows through the coil 80 in the direction indicated, it will cause an upward force on the magnet assembly 76.

Now referring to the coil assembly 82, it is effective for purposes of longitudinally translating the magnet assembly 76 along the horizontal axis. When the current flows in the direction of the arrows as shown in FIG. 7, the vertically extending coil segments 82a and 82c are effective to cause the longitudinal movement to the right. In this regard, it will be noted that the current flowing in the coil segments 82a, and 82c is in opposite directions. Since each of the electromagnetic fields generated by these coil segments is in the opposite directions, they respectively cooperate with the magnetic fields of the permanent magnets 78a, 78b to effect a rightward displacement. Obviously, to effect a leftward displacement, current can be passed through the flat coil 82 in the opposite direction from the control circuit 86. In this particular embodiment, the coil segments 82b and 82d do not effect movement because they, in effect, cancel each other out. Stated somewhat differently, the force generated by the permanent magnets 78a and 78b with the coil segment 82b is such that it is equal to and offsets the forces generated by the coiled segments 82d and the permanent magnets 78a and 78b. To insure that these forces cancel each other out, it will be appreciated that their lengths and number of windings or elements in each segment are equal.

To effect downward vertical movement, the coil assembly 84 is energized by the control circuit 86. If the current flows in the direction of the arrow indicated in FIG. 7, the coil segments 84a are effective to interact with the south pole S of the magnet 78b so as to effect a downward vertical displacement of the magnet assembly 76. The other segments of the coil 84 do not interfere with the magnetic field of the south pole.

Although this embodiment has been described with three planar coils, it will be appreciated that the noted movement can be affected by two planar coils, such as the planar coil 80 and 82. In this latter case, current would selectively flow through the coil 80 in opposing directions to effectuate vertical reciprocation.

It is believed the operation of the foregoing described embodiment has been evident from the description above. However, to supplement the foregoing the following brief description will be set forth. To advance the armature assembly 76 only rightwardly from the position shown in FIG. 7, it will be appreciated that current is sent through the coil 82 as indicated by the arrows. In this regard, the opposing coil segments 82a and 82c cooperate with their respective magnetic fields to act in unison for purposes of driving the armature assembly 76 rightwardly. Upward vertical movement is imparted to the armature assembly 76 by energizing the top planar coil 80. Towards this end, the coil segments 80a have current flowing therethrough so as to establish an electromagnetic field which cooperates with the magnetic field of the permanent magnet 78a to bring about upward vertical movement. Downward movement can be effected by energizing the coil 84. It will be appreciated, of course, that if the coils 80, 82 and 84 are simultaneously energized the armature assembly 76 will move with the force and in a direction which is the resultant of the forces created by these coils. Thus, it is possible to move the armature assembly 76 not only along the vertical or horizontal axes, but along any desired axes in between. This would be determined by the magnitude and direction of current flow in the coils 80–84. Obviously, by reversing the polarity and by varying current amplitude, the direction and speed of the armature assembly 76 can be changed as desired. Thus, a highly compact and effective actuator is provided which allows not only an armature to move in multiple directions but in a manner which can be easily and precisely controlled.

Figures 8, 9:
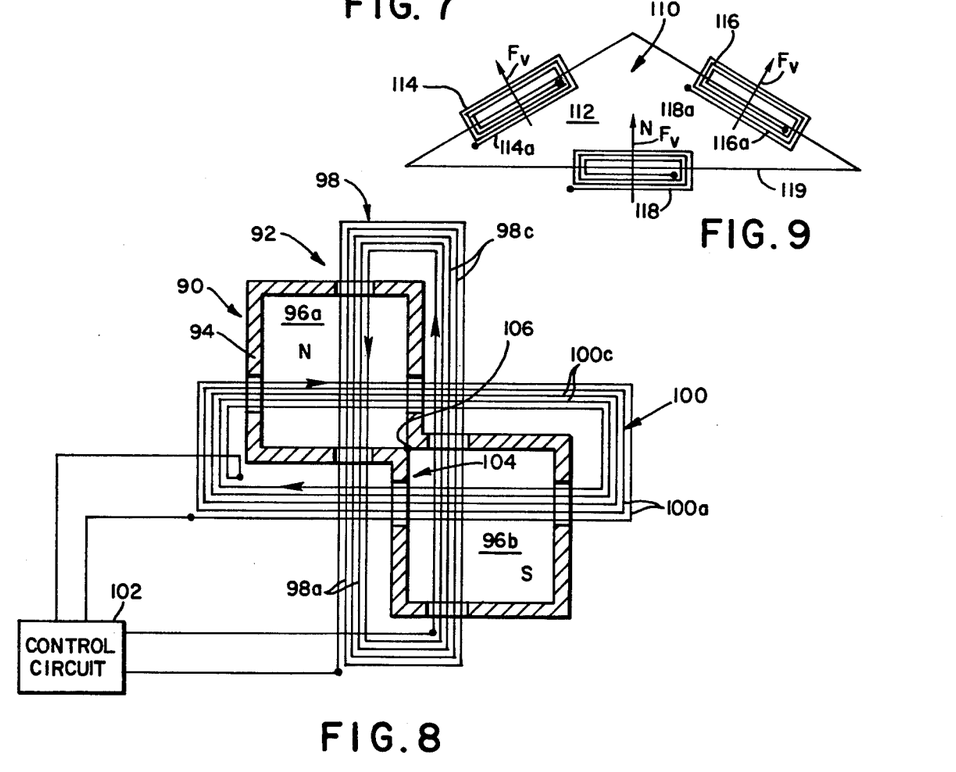

Reference is now made to FIG. 8 for purposes of showing another embodiment of the present invention. This embodiment is similar to the one described in FIG. 7 insofar as an armature can be moved to a plurality of different positions, along different paths. This actuator 90 includes a movable armature or magnet assembly 92 having a plastic jacket 94 with rectangular recesses formed in and offset with respect to each other for receiving and maintaining in offset fashion a pair of permanent magnets 96a and 96b. These magnets 96a, 96b are, preferably, of the rare earth type, such as samarium cobalt. As illustrated in FIG. 8, the magnet 96a has its north polar face N facing outwardly, while the magnet 96b has its south polar face S facing outwardly from the plane of the paper. Superposed at right angles to each other is a pair of stationary flat rectangular coils 98 and 100. Each of the coils 98 and 100 is connected to a suitable control circuit 102 which can control DC current to the coils 98, 100.

In this embodiment, it will be noted that coil segments 98a extend across the north magnetic field of the permanent magnet 96a, whereas the coil segments 98c extend across the south magnetic field of the permanent magnet 96b. The field coil 100 has the coil segments 100a extend horizontally through the south magnetic field of the magnet 96b, whereas the segments 100c extend horizontally through the north magnetic field of permanent magnet 96a. It will be noted that the end coil segments of each of the field coils 98 and 100 extend beyond the permanent magnets 96a and 96b. Therefore, it is intended that these end portions not interact with the noted magnetic fields. In this manner, they, when energized, do not alter the desired movement of the magnet assembly.

An area 104 is defined by the overlapping transverse coils 98 and 100 which has no overlapping of the coil segments. This area 104 defines the preferred metes and bounds in which the central point 106 can be moved to by taking any number of paths. These paths are controlled by the control circuit 102 controlling the voltage transmitted to the field coils 98, 100. More specifically, the amplitude and polarity of the current in the coils 98, 100 can be regulated, whereby the speed and direction of movement of the central point 106 within the central area 104 is regulated so as to move to the central point 106 from one point to another along any desired path.

In operation, the magnet assembly 92 can move upwardly vertically, if current is traveling through the coil 100 in the direction indicated by the arrows in FIG. 8. Thus, the coil segments 100a interact with the south pole S and the coil segments 100c interact with the north pole N to drive the magnet assembly 92 including the central point 106 upwardly. Thus, both of these forces act in conjunction with each other. It will be appreciated that to drive the magnet assembly vertically downwardly the control circuit 102 merely has to change the polarity of the voltage transmitted to the coil 100. To affect horizontal movement of the magnet assembly 92, it will be appreciated that the control circuit 102 can transmit voltages to the field coil 98 in a manner such that the coil segments 98a interact with the north magnetic field generated by magnet 96a and the coil segments 98c interact with the south magnetic pole of the magnet 96b. If the flow of current is in the direction of the arrows, this movement is a rightward linear displacement of the magnet assembly 92. It will be appreciated that to effect only rightward movement, the field coil 100 is deenergized. On the other hand, to move the central point 106 in any given direction within the central area 104, it is possible to have the control circuit 102 to vary voltages transmitted to the field coils 98 and 100 such that their polarity and amplitude can vary the direction and speed at which the magnet assembly 92 can move. Thus, the central point 106 can move at a speed and in a direction which depends upon the proportion of the magnitude and direction of current flowing in the field coils 98 and 100.

As with the previous embodiment, although the present invention has described that the magnet assembly 92 is movable relative to the coils 98, 100, it will be appreciated that these coils can be made movable relative to a fixed magnet assembly.

Although movement of the armature assembly 92 has been described above wherein the point 106 can preferably move within the central area 104, the actuator 90 would still function, but in a less precise and efficient manner if the central point 106 traveled beyond this area. This would be so because it would mean that the magnets 96a, 96b would interfere with other coil segments of the coils 98, 100 which would produce countervailing forces to the desired driving forces.

Reference is now made to FIG. 9 for purposes of showing another embodiment of the present invention. In this embodiment, a permanent magnet 110 has its face 112 defining a north magnetic pole N. Preferably, the magnet 110 is of the rare earth type and is mounted by means not shown for multidirectional movement in the plane of the drawing.

Disposed in juxtaposed relationship above the magnet face 112 is a plurality of field coils 114, 116, 118. The coils 114–118 are at different angular orientations with respect to each other and the magnet 110. Although the coils 114–118 are shown in the same plane, they need not be. These coils 114–118 are similar to those of the previous embodiment and are mounted so as to be stationary. A control circuit (not shown, but similar to those described above) is connected to each of the coils 114–118 and can control the amplitude and polarity of the DC voltage passing to separate ones of them. The control circuit can selectively energize the coils 114–118 so as to effect relative movement between the magnet 110 and the coils 114–118 in a manner to be described. Referring back to the coils 114–118, they have their respective segments 114a–118a over a portion of the magnet face 112. Separate energization of respective ones of the field coils would cause movement of the magnet 110 transversely to the respective ones of the coil segments 114a–118a as indicated by the force vector lines $F_y$.

To effect movement of the magnet 110 along a given path and in a given direction relative to the field coils 114–118, voltage is supplied to selected ones of the coils by the control circuit. By selecting which of the coils are to be energized as well as the magnitude and polarity of the voltages supplied thereto, movement of the magnet 110 can be controlled. For instance, if only the coils 114 and 116 are energized with voltages having the same magnitude and polarity as indicated by the arrows in the segments 114a, 116a, the magnet 110 will move in the path, generally coincident with the force vector $F_y$ of the coil 118, and with a magnitude which is the resultant of the force vectors $F_y$ of the segments 114a, 116a. Although magnet movement has been illustrated along such a path, it will be appreciated readily that by varying the polarity and magnitude of the voltage to selected ones or all of the field coils 114–118 movement of the magnet 110 can be controlled along multiple directions.

Moreover, it should be noted that although this embodiment shows three field coils and a magnet, other numbers of field coils and magnets can be used consistent with the teachings of this invention.

It should be noted that the actuators described above need not be restricted to a single moving element. They may ultimately contain multiple individually controllable elements. They may also obtain positional control via a digital step-by-step technique or via a single linear proportional control. The actuators are not restricted to open or closed loop control.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. An electromagnetic actuator comprising:
   a permanent magnet arrangement having at least one magnetic field extending therefrom;
   at least one extended conductor; and
   means for mounting said magnet arrangement and said conductor in overlying relationship with said one magnetic field at an angle to said arrangement and said conductor and with at least a portion of said conductor in intersecting relation to said magnetic field so as to effect relative motion between said magnet arrangement and said conductor upon energization of said conductor, and said mounting means including means for fixedly mounting one of said magnet arrangement and said conductor and for mounting the other thereof for translational movement in a plurality of directions whereby said other of said magnet arrangement and said conductor is displaced in one of said plurality of directions in accordance with said energization.

2. The actuator of claim 1 wherein said magnet arrangement is a substantially planar arrangement providing said one field generally normal to the plane of said magnet and said overlying planes are generally parallel to said planar arrangement.

3. The actuator of claim 1 wherein said magnet arrangement provides a pair of oppositely polarized fields extending generally normal to the plane of said magnet arrangement and located in adjacent relation along a given axis of said magnet arrangement.

4. The actuator of claim 1 wherein said conductor includes portions angled with respect to each other whereby said other of said magnet arrangement and said conductor is displaced in a preferred one of said directions upon energization of said conductor.

5. The actuator of claim 1 having a plurality of separately energizable conductors lying in or close to said conductor plane, each of said conductors having a portion thereto configured for intersecting said magnetic field at an angle different from intersecting portions of other conductors.

6. A thin electromagnetic actuator comprising:
   a substantially planar, permanent magnet arrangement of relatively thin cross section providing at least one magnetic field extending generally normal to the plane of said magnet arrangement;
   at least one extended conductor; and
   means for mounting said magnet arrangement and conductor in overlying planes generally parallel to said plane of said magnet arrangement with a portion of said conductor in intersecting relation to said magnetic field whereby relative motion is provided between said conductor and said magnet arrangement in their respective planes upon energization of said conductor, and said mounting means including means for fixedly mounting one of said magnet arrangement and said conductor in its plane and for mounting the other thereof for translational movement in a plurality of directions in its plane whereby said other of said magnet arrangement and conductor is displaced in one of said plurality of directions in its said plane in accordance with said energization.

7. The actuator of claim 6 wherein said permanent magnet arrangement provides a pair of oppositely polarized fields extending generally normal to the plane of said magnet arrangement and located in adjacent relation along a given axis of said magnet arrangement.

8. The actuator of claim 7 wherein said magnet arrangement is an elongated arrangement as measured along said given axis with at least one of said fields being of given minimum width, said given axis being the longitudinal axis of said member, and said conductor being an elongated loop with a width slightly greater than said given minimum width of said magnetic fields and with one of the short portions of said loop configured to intersect at least one of said magnetic fields to effect said relative motion.

9. The actuator of claim 8 wherein said magnet arrangement produces said adjacent magnetic fields at least slightly offset on opposite sides of said longitudinal axis, and said width of said loop while being greater than said given minimum width is equal to or less than said given width plus the amount of offset when said longitudinal axis of said magnet arrangement is aligned with the longitudinal axis of said loop so that said long portions of said loop lie in an offset portion of said fields whereby relative motion between said magnet arrangement and said conductor is both along said given axis and normal thereto upon energization of said conductor loop.

10. The actuator of claim 8 wherein said magnet arrangement produces said adjacent magnetic fields at least slightly offset along a transverse axis of said magnetic arrangement on opposite sides of said longitudinal axis and said conductor loop is of a width such that when said longitudinal axis of said elongated arrangement is aligned with the longitudinal axis of said loop the long portions of said loop lie in one of the offset portions of one of said magnetic fields respectively whereby relative motion is produced along both said longitudinal axis and the transverse axis of said magnet arrangement.

11. The actuator of claim 10 including a plurality of elongated conductor loops mounted in planes generally parallel to said plane of said magnet arrangement with the longitudinal axis of each conductor loop being rotated in the plane of its respective loop with respect to another loop such that energization of any given loop tends to produce relative motion along the longitudinal axis of that loop whereby both translational and rotational relative movement are achieved by successive energization of different loops.

12. The actuator of claim 11 wherein said magnet arrangement produces said adjacent magnetic fields at least slightly offset along a transverse axis of said magnetic arrangement on opposite sides of said longitudinal axis and said conductor loop is of a width such that when said longitudinal axis of said elongated arrangement is aligned with the longitudinal axis of said loop the long portions of said loop lie in one of the offset portions of one of said magnetic fields respectively whereby relative motion is produced along both said longitudinal axis and the transverse axis of said magnet arrangement.

13. An electromagnetic actuator comprising:
a permanent magnet arrangement providing a pair of oppositely polarized fields extending in angularly offset directions from said magnet arrangement;
a conductor assembly having a first conductor portion and a second conductor portion; and
means for mounting said magnet arrangement and said conductor assembly for relative movement with respect to each other and with said first conductor portion extending in a first conductor plane generally normal to one of said fields and said second conductor portion extending in a second conductor plane generally normal to the other of said fields, said mounting means including means for fixedly mounting one of said magnet arrangement and said conductor assembly and for mounting the other thereof for translational movement in a plurality of directions in planes at least parallel to said first and second conductor planes whereby said other of said magnet arrangement and said conductor assembly is displaced in one direction in each of its planes upon energization of said conductor assembly.

* * * * *

UNITED STATES PATENT AND TRADEMARK OFFICE
CERTIFICATE OF CORRECTION

PATENT NO. : 4,458,227

DATED : July 3, 1984

INVENTOR(S) : Christian C. Petersen

It is certified that error appears in the above-identified patent and that said Letters Patent is hereby corrected as shown below:

Claim 14 has been added as shown below:

14. A method of generating multidirectional movement comprising the steps of:
    having a permanent magnet arrangement providing at least a magnetic field extending generally normal to a plane of the magnet arrangement and being mounted for movement along a multiplicity of directions lying in said plane of said magnet arrangement;
    having a plurality of separately energizeable conductors lying in or close to said conductor plane, each of said conductors having a portion thereof configured for intersecting at least one of said magnetic fields at an angle different from the other conductors; and
    energizing selected ones of said conductors to effect relative multidirectional movement between said magnet arrangement and said conductors.

On the title page "13 Claims" should read -- 14 Claims --.

Signed and Sealed this

Twenty-first Day of May 1985

[SEAL]

Attest:

DONALD J. QUIGG

*Attesting Officer*     *Acting Commissioner of Patents and Trademarks*